Aug. 5, 1952

E. E. PRATHER 2,605,872

CLUTCH CONTROL MECHANISM

Filed Dec. 16, 1949

INVENTOR.
EDWIN E. PRATHER
BY
H. O. Clayton
ATTORNEY

Aug. 5, 1952  E. E. PRATHER  2,605,872
CLUTCH CONTROL MECHANISM
Filed Dec. 16, 1949  2 SHEETS—SHEET 2

INVENTOR.
EDWIN E. PRATHER
BY H. O. Clayton
ATTORNEY

Patented Aug. 5, 1952

2,605,872

UNITED STATES PATENT OFFICE 2,605,872

CLUTCH CONTROL MECHANISM

Edwin E. Prather, South Bend, Ind., assignor to Bendix Aviation Corporation, South Bend, Ind., a corporation of Delaware Application December 16, 1949, Serial No. 133,321

7 Claims. (Cl. 192—.052)

This invention relates in general to power means for operating the friction clutch of an automotive vehicle and in particular to pressure differential operated power means controlled by an operation of the accelerator of the vehicle and by operation of either a vehicle speed responsive governor of the change speed transmission of the vehicle.

One of the objects of my invention is to provide a clutch control mechanism including a pressure differential operated motor controlled in part by a transmission, accelerator and governor controlled vacuum cut-in valve operable to make possible a clutch disengaging operation of said motor; and with the mechanism of my invention this valve cooperates with a three-way pressure balance follow-up valve which is actuated by the accelerator and a pressure differential operated motor.

A further object of my invention is to provide, in an automotive vehicle power plant including a friction clutch and a three speeds forward and reverse transmission, a clutch control mechanism including a power operated three-way valve for controlling a connection with a source of vacuum, said valve being normally open, to render the mechanism operative to disengage the clutch, but closed, to disable said mechanism, when the transmission is established either in its second gear setting or its high gear setting; and as an additional feature of my invention the mechanism thereof includes an accelerator operated three-way valve which cooperates with the aforementioned power operated control valve in controlling the operation of the mechanism. With such a clutch control mechanism there is provided means for automatically disengaging the clutch when the accelerator is released the transmission at the time being established in any setting except second gear or high gear.

Yet another object of my invention is to combine, with the aforementioned clutch control mechanism, means for automatically disengaging the clutch when the transmission is established in second gear and the speed of the vehicle is reduced to or below a certain factor; and it is a further object of my invention to combine, with the aforementioned clutch control mechanism, means for automatically disengaging the clutch when the accelerator is released and the speed of the vehicle is reduced to or below a certain factor this clutch disengaging operation being effected despite the fact that the transmission is established either in its second gear setting or its high gear setting. With the latter mechanism included in the clutch control mechanism of my invention there will be no stalling of the engine when the vehicle speed is reduced to or below said factor.

A further object of my invention is to provide a mechanism for operating the clutch of an automotive vehicle the clutch being disengaged by the power means when the accelerator is released and the transmission of the vehicle is established in any setting except second gear and high gear the clutch being re-engaged when the accelerator is depressed, said mechanism further including means for insuring an engagement of the clutch with the transmission established in either of said settings and despite a failure of the driver to depress the accelerator.

Other objects of the invention will appear more fully hereinafter from the following detailed description when taken in connection with the accompanying drawings, where one embodiment of the invention is illustrated.

Figure 1:
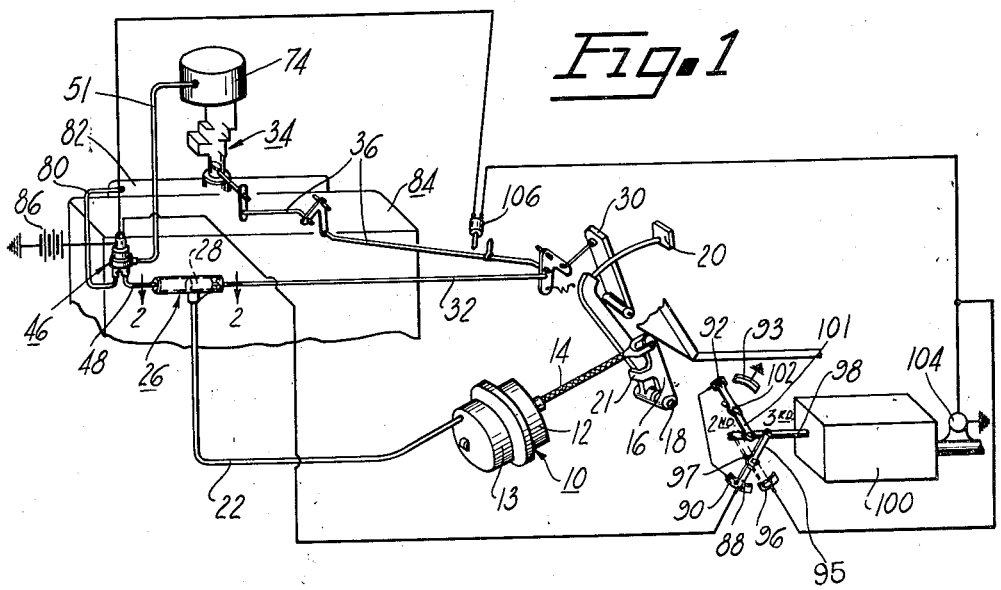
Figure 1 is a diagrammatic view disclosing the principal feature of my invention.

Describing now that embodiment of my invention disclosed in the several figures of the drawings the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 3:
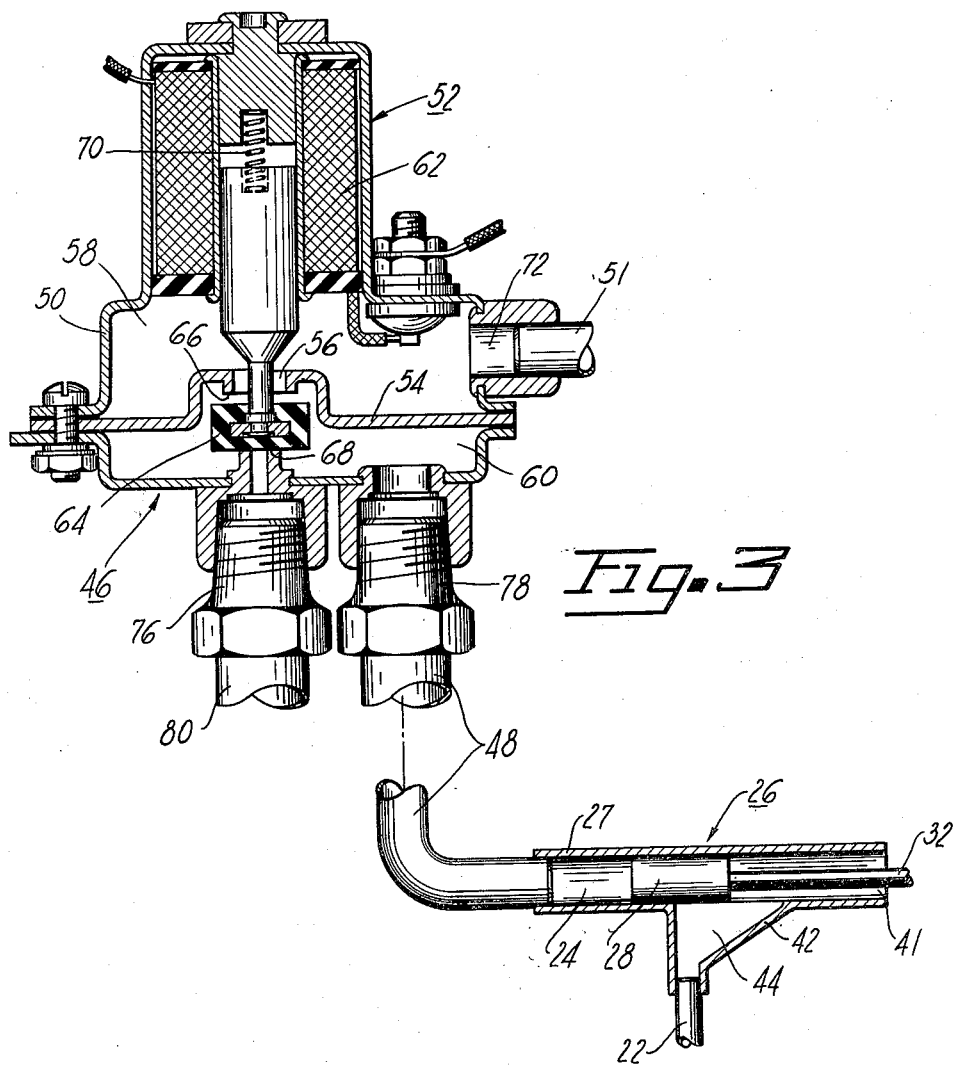
Figure 3 is a vertical section taken on the line 3—3 of Figure 2 together with a sectional view disclosing the details of the solenoid operated vacuum cut-in valve of my invention.

One end of the motor 10, that is, the end of the same constituting a part of the aforementioned control chamber 13 of the motor, is connected by a conduit 22 to a compartment 44 of a control valve unit indicated as a whole by the reference numeral 26 said unit being disclosed in detail in Figure 3. The casing 27 of the valve unit is provided with a cylindrically shaped valve member 28 connected to the accelerator 30 of the vehicle by a rod 32. The accelerator is also connected to the throttle valve of the carburetor 34 of the vehicle by means of linkage 36.

Figure 2:
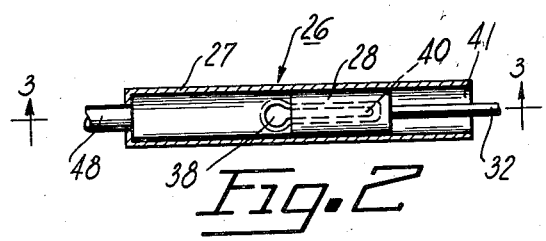
Figure 2 is a horizontal section taken on the line 2—2 of Figure 1.

As is disclosed in Figure 2 the valve casing 27 is also provided with an opening 38 and a slot 40 extending rearwardly from said opening; and the casing is recessed at 42 to provide a chamber 44, said chamber serving to interconnect the conduit 22 with the slot 40, the latter being vented to the atmosphere via the hollow and open end portion 41 of the casing. The valve casing 27 is connected to a power operated three-way vacuum cutin valve 46 by means of a conduit 48; and this valve includes a two-part casing 50, the upper part housing a solenoid 52. A partition 54 having an opening 56 therein provides, together with the two casing parts, control chambers 58 and 60. To the armature 62 of the solenoid there is secured a valve member 64 adapted to seat at 66 when the solenoid is energized and upon a seat 68 when the solenoid is de-energized. The latter seating operation is effected by a spring 70. A port 72 in the casing 50, together with a conduit 51, serves to interconnect an air cleaner 74 with the control chamber 58; and couplings 76 and 78, connected to the valve chamber 60, are connected respectively, with the conduit 80 and a conduit 48, the former being connected to the intake manifold 82 of the internal combustion engine 84 of the vehicle.

Describing now one of the important features of my invention, that is, the electrical means for controlling the operation of the solenoid 52, the latter is, in part, controlled by a grounded battery 86, a transmission operated breaker switch 88, 90 and a transmission operated breaker switch 92, 93, the battery and the two switches being electrically connected in series with each other. As is disclosed in Figures 1 and 4 the switch 88, 90 includes a fixed contact 90 and a movable contact 88 the latter being preferably mounted on one end of a lever 95 fulcrumed at 97. The upper end of the lever is pivotally connected to a rod 98 which is connected to the second and high gear shift rail of a three speeds forward and reverse transmission 100. The movable contact 92 of the switch 92, 93 is mounted on the end of a lever 101 fulcrumed at 102, one end of said lever being pivotally connected to the rod 98. The transmission operated switch mechanism also includes a switch 88, 96 comprising the movable contact 88 and a fixed contact 96. A grounded vehicle speed responsive governor operated switch 104 is included in the control for controlling the operation of the solenoid 52.

Figure 4:
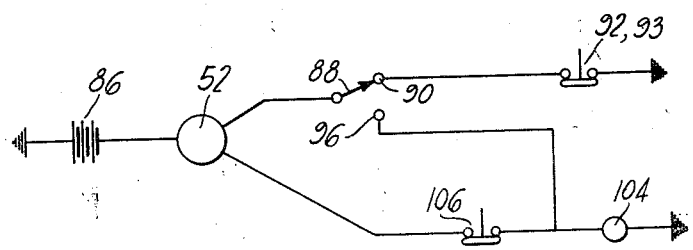
Figure 4 is a view disclosing the electrical means for controlling the valve operating solenoid of Figure 3.

As is disclosed in Figure 4 an accelerator operated breaker switch 106 and the solenoid 52 are electrically connected in series with the grounded battery 86 and the grounded governor operated switch 104; and the solenoid 52 and transmission operated switch 88, 96 are electrically connected in series with the grounded battery and the grounded governor operated switch.

The parts of the transmission operated switches 88, 90 and 88, 96 and the levers 95 and 101 are so constructed and arranged that the switch 88, 90 is made in all of the settings of the transmission except the second gear setting thereof and at this time said switch is broken; the switch 92, 93 is made in all settings of the transmission except the high gear setting thereof and at that time said switch is broken; and the switch 88, 96 is made only when the transmission is established in its second gear setting.

Briefly describing the operation of the mechanism of my invention it will be assumed that the car is at a standstill and that the transmission is established in its neutral setting. With the engine idling to provide a source of vacuum in the intake manifold 82 the driver will then release the accelerator 30 to open the three-way valve 26 thereby energizing the motor 10 to disengage the clutch. In this operation the valve member 28 is moved to the right, Figure 2, thereby interconnecting the conduits 22 and 48. The valve 46, Figure 3, is at this time opened to connect the conduits 80 and 48; for at this time the switches 104 and 106 are closed to energize the solenoid 52.

The driver will then probably place the transmission in its low gear setting whereupon he will depress the accelerator to open the throttle and close the valve 26 to de-energize the motor 10. The clutch will then be engaged and the vehicle will be gotten under way. The driver, to establish the second gear setting of the transmission, will release the accelerator to disengage the clutch and he will then move the gear shift lever, not shown, to its second gear position. A subsequent depression of the accelerator will then open the valve 26 to effect a clutch engaging operation of the motor 10.

Now when the transmission is established in its second gear setting the switch 88, 90 is broken and the switch 88, 96 is closed; however, if the car speed is under governor speed, that is, the vehicle speed necessary to close the governor operated switch 104, then the clutch will be automatically disengaged when the driver releases the accelerator to open the valve 26; and this he will do preparatory to moving the shift lever to its high gear position to establish the transmission in its high gear setting. After the transmission is established in its high gear setting the driver will depress the accelerator thereby closing the valve 26 to effect an engagement of the clutch.

Thereafter with the transmission in its high gear setting the clutch will remain engaged when the driver releases the accelerator; for at this time the switch 92, 93 is broken. An undesirable coasting or free-wheeling of the vehicle is thus prevented when the transmission is established in high gear and the vehicle is traveling above governor speed; however, if the car is then slowed down below governor speed to close the switch 104 and the accelerator is released to close the switch 106, then the clutch will be automatically disengaged thereby preventing a stalling of the engine.

One of the important features of my invention lies in the provision of the switch 88, 96 whereby there is provided a control for automatically effecting an engagement of the clutch with the vehicle traveling above governor speed and after the transmission is established in its second gear setting, and despite the driver's failure to depress the accelerator to close the valve 26; for with the inclusion of this switch a coasting of the vehicle, by a disengagement of the clutch, is prevented after the transmission is established in its second gear setting. Explaining this feature of my invention when the switch 88, 90 is opened, by placing the transmission in second gear, the motor 10 is vented to the atmosphere via the closed valves 46 and 26 and the conduits 48 and 22. The transmission being then in second the internal combustion engine will act as a brake when descending grades.

Another feature of my invention lies in the provision of the switch 104 whereby there is provided means for automatically effecting a disengagement of the clutch when the transmission is established in its second gear setting and the vehicle is slowed down to or below governor speed. As with the cooperating switches 104 and 106 the switch 88, 96 in cooperation with the switch 104 provides a means for effecting a disengagement of the clutch to thereby prevent a stalling of the engine.

Although only one embodiment of the invention has been illustrated and described, various changes in the form and relative arrangements of the parts may be made to suit requirements.

I claim:

1. In an automotive vehicle provided with an accelerator, a change speed transmission, a friction clutch, and a source of vacuum, power means for operating the clutch including a pressure differential operated motor, fluid transmitting means interconnecting the source of vacuum and the motor, an accelerator operated three-way valve incorporated in the fluid transmitting means and operative to either interconnect the source of vacuum with the motor to energize the same or vent the latter to the atmosphere to effect a de-energization thereof, a power operated three-way valve incorporated in the fluid transmitting connection between the accelerator operated valve and the source of vacuum, means, including a solenoid, for actuating the power operated valve, and electrical means for controlling the operation of the solenoid including, in series therewith, a breaker switch which is opened when the transmission is established in a certain setting and closed when the transmission is established in all other settings, and further including another breaker switch which is opened when the transmission is established in another certain setting and closed when the transmission is established in all other settings.

2. In an automotive vehicle provided with an accelerator, a change speed transmission, a friction clutch, a vehicle speed responsive governor and a source of vacuum, power means for operating the clutch including a pressure differential operated motor, fluid transmitting means interconnecting the source of vacuum and the motor, an accelerator operated three-way valve incorporated in the fluid transmitting means and operative to either interconnect the source of vacuum with the motor to energize the same or vent the latter to the atmosphere to effect a de-energization thereof, a power operated three-way valve incorporated in the fluid transmitting connection between the accelerator operated valve and the source of vacuum, means, including a solenoid, for actuating the power operated valve, an electrical means for controlling the operation of the solenoid including, in series therewith, a breaker switch which is opened when the transmission is established in a certain setting and closed when the transmission is established in all other settings, and another breaker switch which is opened when the transmission is established in another certain setting and closed when the transmission is established in all other settings, together with electrical means including, in series, a transmission operated switch and a switch operated by the governor, for controlling the operation of the solenoid to open the power operated valve when the speed of the vehicle is reduced to a certain factor and the transmission is established in a certain setting.

3. In an automotive vehicle provided with an accelerator, a vehicle speed responsive governor, a three-speeds forward and reverse transmission, a friction clutch, and a source of vacuum, power means for operating the clutch including a pressure differential operated motor, fluid transmitting means interconnecting the source of vacuum and the motor, an accelerator operated valve incorporated in the fluid transmitting means and operative to either interconnect the source of vacuum with the motor to energize the same or vent the latter to the atmosphere to effect a de-energization thereof, a power operated valve incorporated in the fluid transmitting connection between the accelerator operated valve and the source of vacuum, means, including a solenoid, for actuating the power operated valve, and electrical means for controlling the operation of the solenoid including, in series therewith, a breaker switch which is opened when the transmission is established in its second gear setting and closed when the transmission is established in all other settings, together with electrical means electrically connected in parallel with the latter switch and including, in series, a transmission operated switch and a switch operated by the governor for controlling the operation of the solenoid to open the power operated valve when the speed of the vehicle is reduced to a certain factor and the transmission is established in its second gear setting.

4. In an automotive vehicle provided with an accelerator, a change speed transmission, a friction clutch and a source of vacuum, power means for operating the clutch including a pressure differential operated motor, fluid transmitting means interconnecting the source of vacuum and the motor, an accelerator operated valve incorporated in the fluid transmitting means and operative to either interconnect the source of vacuum with the motor to energize the same or vent the latter to the atmosphere to effect a de-energization thereof, a power operated valve incorporated in the fluid transmitting connection between the accelerator operated valve and the source of vacuum, means, including a solenoid, for actuating the power operated valve, and electrical means for controlling the operation of the solenoid including, in series therewith, a breaker switch which is opened when the transmission is established in a certain setting and closed when the transmission is established in all other settings and another breaker switch which is opened when the transmission is established in another certain setting and closed when the transmission is established in all other settings, together with other electrical means, including an accelerator operated switch which is closed when the accelerator is released, a transmission operated switch which is closed when the transmission is established in a certain setting, and a grounded governor operated switch electrically connected with the latter two switches, also operative to control the operation of the solenoid.

5. In an automotive vehicle provided with a friction clutch, an accelerator, a vehicle speed responsive governor, a three speeds forward and reverse transmission and a source of vacuum, power means for operating the clutch including a pressure differential operated motor operably connected to the clutch, fluid transmitting means interconnecting the vacuum source with the motor, an accelerator operated three-way valve incorporated in the fluid transmitting connection and operative to either connect the motor with the vacuum source or vent the same to the atmosphere, a power operated three-way valve incorporated in the fluid transmitting connection between the vacuum source and the accelerator operated three-way valve, means, including a solenoid, for controlling the operation of the power operated valve, and electrical means for controlling the operation of the solenoid including a grounded switch operated by the governor, means interconnecting the latter switch and solenoid including, in parallel, a switch operated by the accelerator and a transmission operated switch which is made only when the transmission is established in its second gear setting, said electrical means further including, in series, a transmission operated switch which is broken only when the transmission is established in its second gear setting and a transmission operated switch which is broken only when the transmission is established in its high gear setting.

6. In an automotive vehicle provided with a source of vacuum, a vehicle speed responsive governor, a friction clutch and a three-speeds forward and reverse transmission, power means for operating the clutch including a pressure differential operated motor operably connected to the clutch, fluid transmitting means interconnecting the vacuum source with the motor, means for controlling the operation of motor including a power operated three-way valve incorporated in said fluid transmitting means between the vacuum source and motor, another three-way valve incorporated in the fluid transmitting connection between the vacuum source and motor, means for operating the power operated valve including a solenoid, means for controlling the operation of the solenoid to operate the latter valve including a transmission operated switch which is opened only when the transmission is established in its second gear setting and further including, in series with the latter switch, another transmission operated switch which is opened only when the transmission is established in its high gear setting; together with means, including a transmission operated switch which is closed when the transmission is established in second gear and a governor operated switch connected in series therewith, for supplementing the aforementioned two transmission operated switches in the control of the solenoid.

7. In an automotive vehicle provided with a friction clutch, a three speeds forward and reverse transmission, an accelerator, and a vacuum source, power means for operating the clutch including a pressure differential operated motor, a fluid transmitting means interconnecting the vacuum source with the motor, an accelerator operated three-way valve incorporated in said connection and operative to control the operation of said motor, a spring and solenoid operated valve incorporated in said fluid transmitting connection between the vacuum source and the accelerator operated three-way valve, means for controlling the operation of the spring and solenoid operated valve including a breaker switch operative, when the transmission is established in any setting except high gear, for effecting an opening of the spring and solenoid operated valve, means operative, when the accelerator is released and the vehicle is traveling below a certain speed, for effecting an opening of the spring and solenoid operated valve, together with means, operative when the transmission is established in its second gear setting, for disabling the operation of the transmission operated breaker switch, and means, cooperating with the last mentioned means and operative, when the transmission is established in its second gear setting and the vehicle is traveling below a certainn speed, for effecting an opening of the spring and solenoid operated valve.

EDWIN E. PRATHER.

REFERENCES CITED

The following references are of record in the file of this patent:

UNITED STATES PATENTS

| Number | Name | Date |
|---|---|---|
| 2,197,721 | Goepfrich | Apr. 16, 1940 |
| 2,280,002 | Neracher | Apr. 14, 1942 |
| 2,296,290 | Mayrath | Sept. 22, 1942 |
| 2,317,216 | Paton | Apr. 20, 1943 |
| 2,326,943 | Hill | Aug. 17, 1943 |
| 2,348,435 | Hey et al. | May 9, 1944 |
| 2,365,469 | Hey et al. | Dec. 19, 1944 |
| 2,380,677 | Schjolin | July 31, 1945 |